(12) United States Patent
Akaike et al.

(10) Patent No.: US 7,618,091 B2
(45) Date of Patent: Nov. 17, 2009

(54) HEAD REST CONTROL DEVICE AND ACTIVE HEAD REST

(75) Inventors: Fumitoshi Akaike, Kariya (JP); Kiyoka Matsubayashi, Toyota (JP)

(73) Assignees: Toyota Boshoku Kabushiki Kaisha, Aichi (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 10/587,679

(22) PCT Filed: Jan. 28, 2005

(86) PCT No.: PCT/JP2005/001210

§ 371 (c)(1), (2), (4) Date: May 24, 2007

(87) PCT Pub. No.: WO2005/073019

PCT Pub. Date: Aug. 11, 2005

(65) Prior Publication Data

US 2007/0257528 A1    Nov. 8, 2007

(30) Foreign Application Priority Data

Jan. 30, 2004 (JP) .............................. 2004-024292

(51) Int. Cl.
*B60N 2/48* (2006.01)
(52) U.S. Cl. .................. 297/216.12; 297/391
(58) Field of Classification Search .............. 297/216.1, 297/216.12, 391, 408, 409
See application file for complete search history.

(56) References Cited

U.S. PATENT DOCUMENTS 3,888,329 A * 6/1975 Monaghan .................. 280/734
5,694,320 A * 12/1997 Breed ........................... 701/45
6,088,640 A * 7/2000 Breed ........................... 701/45
6,196,579 B1 * 3/2001 Bowers et al. .............. 280/735
6,331,014 B1   12/2001 Breed
6,402,195 B1 * 6/2002 Eisenmann et al. ......... 280/735
6,568,753 B1   5/2003 Watanabe
6,568,754 B1 * 5/2003 Norton et al. .......... 297/216.12
6,623,073 B2 * 9/2003 Schafer et al. ......... 297/216.12
6,746,078 B2 * 6/2004 Breed .................... 297/216.12

(Continued)

FOREIGN PATENT DOCUMENTS

EP      1 375 245 A2    1/2004

(Continued)

*Primary Examiner*—David Dunn
*Assistant Examiner*—James Alex
(74) *Attorney, Agent, or Firm*—Patterson, Thuente, Skaar & Christensen, P.A.

(57) ABSTRACT

It is an object of this invention to provide an active headrest which will not over-push the head of a passenger. For this purpose, the invention provides a headrest controller for moving a part (20A) or whole of a headrest (20) of a vehicle seat toward a head of the passenger to reduce the distance between the headrest (20) and the head in the horizontal direction by predicting or detecting a crash to the rear of the vehicle, including a head position detecting unit (11) for detecting a predetermined state of approach or state of contact of the headrest (20) to or with the head during the movement of the headrest (20) and a control circuit for stopping the headrest based on a detection signal from the head position detecting unit (11).

20 Claims, 7 Drawing Sheets

U.S. PATENT DOCUMENTS

| | | | |
|---|---|---|---|
| 6,805,404 B1 * | 10/2004 | Breed | 297/216.12 |
| 2003/0015898 A1 * | 1/2003 | Breed | 297/216.12 |
| 2003/0121704 A1 | 7/2003 | Breed et al. | |
| 2006/0226688 A1 * | 10/2006 | Terada et al. | 297/391 |
| 2007/0027599 A1 * | 2/2007 | Sakai et al. | 701/49 |
| 2007/0085400 A1 * | 4/2007 | Terada et al. | 297/391 |

FOREIGN PATENT DOCUMENTS

| | | |
|---|---|---|
| GB | 2 301 906 A | 12/1996 |
| JP | 01229737 | 9/1989 |
| JP | 2000-233713 | 8/2000 |
| JP | 2000-309242 | 11/2000 |
| JP | 2001-001820 | 1/2001 |
| JP | 2002-039739 | 2/2002 |
| JP | 2004-009891 | 1/2004 |
| JP | 2004-122856 | 4/2004 |

* cited by examiner

HEAD REST CONTROL DEVICE AND ACTIVE HEAD REST

TECHNICAL FIELD

The present invention relates to a headrest controller for moving part or whole of a headrest of a seat of a vehicle toward the head of a passenger to reduce the distance between the headrest and the head in the horizontal direction by predicting or detecting a crash to the rear of the vehicle and relates to an active headrest.

BACKGROUND ART

Various types of active headrests have been known, and known active headrests include, for example, those disclosed in Patent Document 1 (JP-A-11-334439), Patent Document 2 (JP-A-2004-9891), Patent Document 3 (JP-A-2000-309242), and Patent Document 4 (JP-A-2000-233713).

An active headrest according to an invention disclosed in Patent Document 1 has a configuration in which the headrest is tilted based on a detection signal from a crash detecting sensor for predicting or detecting a rear crash. It is configured such that an abutting surface (a front part) of the headrest is moved toward a passenger and is also tilted obliquely and upwardly as the headrest is tilted.

An active headrest according to an invention disclosed in Patent Document 2 includes a headrest driving mechanism for advancing the headrest toward the head of a passenger when a crash to the rear of the vehicle is predicted.

An active headrest according to an invention disclosed in Patent Document 3 includes a headrest driving mechanism for moving the headrest up and down, a sensor for detecting the position of the head of a passenger at a surface of the headrest, and elevation adjusting devices for adjusting the elevation of the headrest by operating the headrest driving mechanism based on a detection signal from the sensor.

An active headrest according to an invention disclosed in Patent Document 4 includes a headrest driving mechanism for upwardly moving the headrest toward the head of a passenger when a crash to the rear of the vehicle is predicted.

An invention according to Patent Document 5 (JP-A-2004-122856) is a vehicle passenger protection apparatus, and the passenger protection apparatus includes prediction means for predicting a crash and moving means for moving a vehicle seat to a predetermined position for protecting passenger based on a signal from the prediction means.

Referring to the active headrests disclosed in Patent Documents 1 and 2, the amount of the movement of the headrests upon detection of a crash is always constant regardless of the position of the head of a passenger. Incidentally, the position of the head of a passenger depends on the stature of the passenger and soon. As a result, the active headrests according to Patent Documents 1 and 2 have sometimes been uncomfortable for a passenger because the headrests can push the head of a passenger too much.

Under the circumstance, it is an object of the invention to provide an active headrest which will not over-push the head of a passenger.

SUMMARY OF THE INVENTION

In order to solve the above-described problem, the invention is characterized in that it provides a headrest controller and an active headrest having a configuration as described in each claim.

A headrest controller according to a first invention includes a head position detecting unit for detecting a predetermined state of approach or state of contact of a headrest to or with a head during the movement of said headrest and a control circuit for stopping the headrest based on a detection signal from said head position detecting unit.

Therefore, the headrest can be stopped at a proper position in accordance with the position of the head of a passenger. For example, the headrest can be stopped at a position where the head will not be over-pushed.

In a headrest controller according to a second invention, the head position detecting unit includes two or more sensors which are different from each other in the method of detection. The control circuit stops the headrest when the predetermined state of approach or state of contact is detected by any of the sensors.

In a headrest controller according to a third invention, the head position detecting unit includes a sensor for detecting the predetermined state of approach and a sensor for detecting the state of contact. The control circuit stops the headrest when the predetermined state of approach or state of contact is detected by either of the sensors.

In a headrest controller according to a fourth invention, the head position detecting unit has a plurality sensors of at least one type of sensor among the two or more types of sensor different from each other in the method of detection.

In a headrest controller according to a fifth invention, the head position detecting unit has a plurality sensors of at least one type of sensor among a type of sensor for detecting the predetermined state of approach or a type of sensor for detecting the state of contact.

Headrest controllers according to sixth and seventh inventions have a configuration in which the head position detecting unit is provided in a front part of the headrest.

A headrest controller according to an eighth invention includes a crash detecting sensor for predicting or detecting a crash to the rear of the vehicle, a headrest driving mechanism for moving part or whole of a headrest of a vehicle seat toward a head of a passenger to reduce the distance between the headrest and the head in the horizontal direction, a head position detecting unit for detecting that the headrest has entered a predetermined state of approach or state of contact to or with the head, and a control circuit for operating the headrest driving mechanism when the crash detecting sensor outputs a detection signal and stopping the headrest driving mechanism when the head position detecting unit outputs a detection signal.

It is therefore possible to move the headrest toward the head of the passenger and to stop the headrest at a proper position in accordance with the position of the head of the passenger.

In a headrest controller according to a ninth invention, the head position detecting unit includes sensors of two or more types of sensor which are different from each other in the method of detection. The control circuit stops the headrest when the predetermined state of approach or state of contact is detected by any of the sensors.

In a headrest controller according to a tenth invention, the head position detecting unit includes a sensor for detecting the predetermined state of approach and a sensor for detecting the state of contact. The control circuit stops the headrest when the predetermined state of approach or state of contact is detected by either of the sensors.

In a headrest controller according to an eleventh invention, the crash detection sensor is a sensor for predicting a crash to the rear of the vehicle, and the control circuit is configured to return the headrest to an initial position by operating the headrest driving mechanism in the opposite direction when a predetermined time passes after the crash detecting sensor outputs a detection signal.

Therefore, according to the invention, the headrest returns to the initial position when the predetermined time passes after it is moved. Thus, the headrest is automatically returned to the initial position when the forward movement becomes unnecessary, e.g., when no crash has occurred. Since the headrest is thus returned to its normal state, it is easy to use.

An active headrest according to a twelfth invention includes a headrest driving mechanism for moving a front part of a headrest in a front-rear direction in which the distance between the head of a passenger and the front part of the headrest is decreased, a head position detecting unit for detecting the distance between the head of the passenger and the front part of the headrest in the front-rear direction, and adjusting devices for adjusting the distance between the head of the passenger and the front part of the headrest in the front-rear direction to a predetermined amount distance by stopping the headrest driving mechanism based on a detection signal from the head position detecting unit.

It is therefore possible to move the front part of the headrest toward the head of the passenger and to stop the front part of the headrest at a proper position in accordance with the position of the head of the passenger. For example, the front part of the headrest can be stopped at a position where the head will not be over-pushed by the front part of the headrest.

An active headrest according to a thirteenth invention includes automatic retraction devices which moves the front part of the headrest rearward when the front part of the headrest has been stopped for a predetermined time at a predetermined position in which the distance between the head of the passenger and the front part of the headrest is the predetermined amount.

That is, the front part of the headrest returns to the initial position when it has spent the predetermined time in the predetermined position.

Therefore, the front part of the headrest is automatically returned to the initial position when the forward movement becomes unnecessary, e.g., when no crash has occurred. Since the headrest is thus returned to its normal state, it is easy to use.

DESCRIPTION OF REFERENCE NUMERALS

Figure 1:
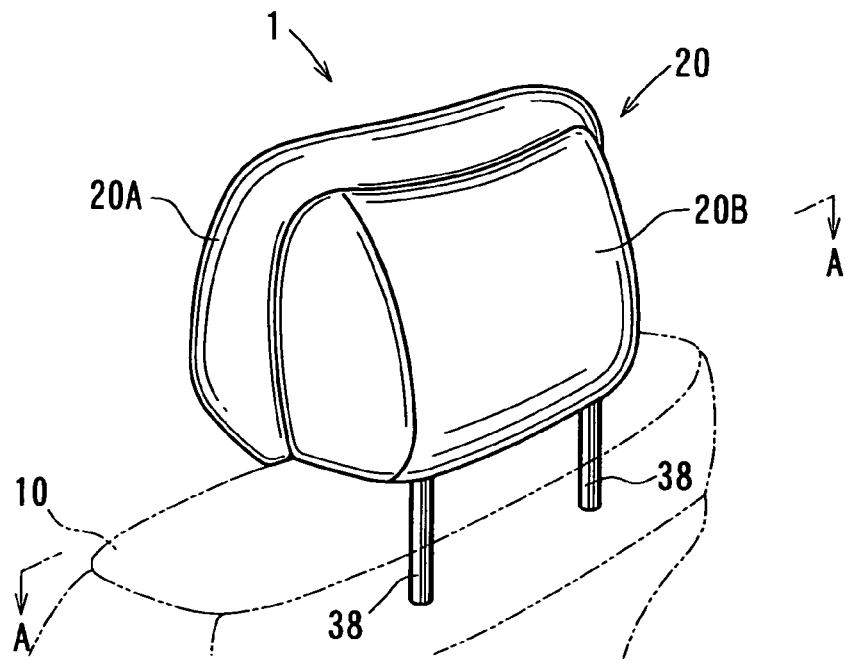
FIG. 1 is a rear perspective view of an active headrest according to Embodiment 1.

1: active headrest
2, 7: contact detecting sensor
5: control circuit
6: approach detecting sensor
11, 13: head position detecting unit
12: timer
20: headrest
20A: front part
20B: rear part
30: headrest driving mechanism
33, 34: guide hole
35, 36: link member

DETAILED DESCRIPTION OF THE INVENTION

As shown in FIG. 1, an active headrest 1 includes a headrest 20 and a pair of legs 38 protruding downward from a bottom surface of the headrest 20.

The legs 38 are connected to a frame (omitted in the figure) provided on a seatback 10 such that it can be moved up and down, whereby the headrest 20 is supported above the seatback 10 such that it can be moved up and down.

Figure 4:
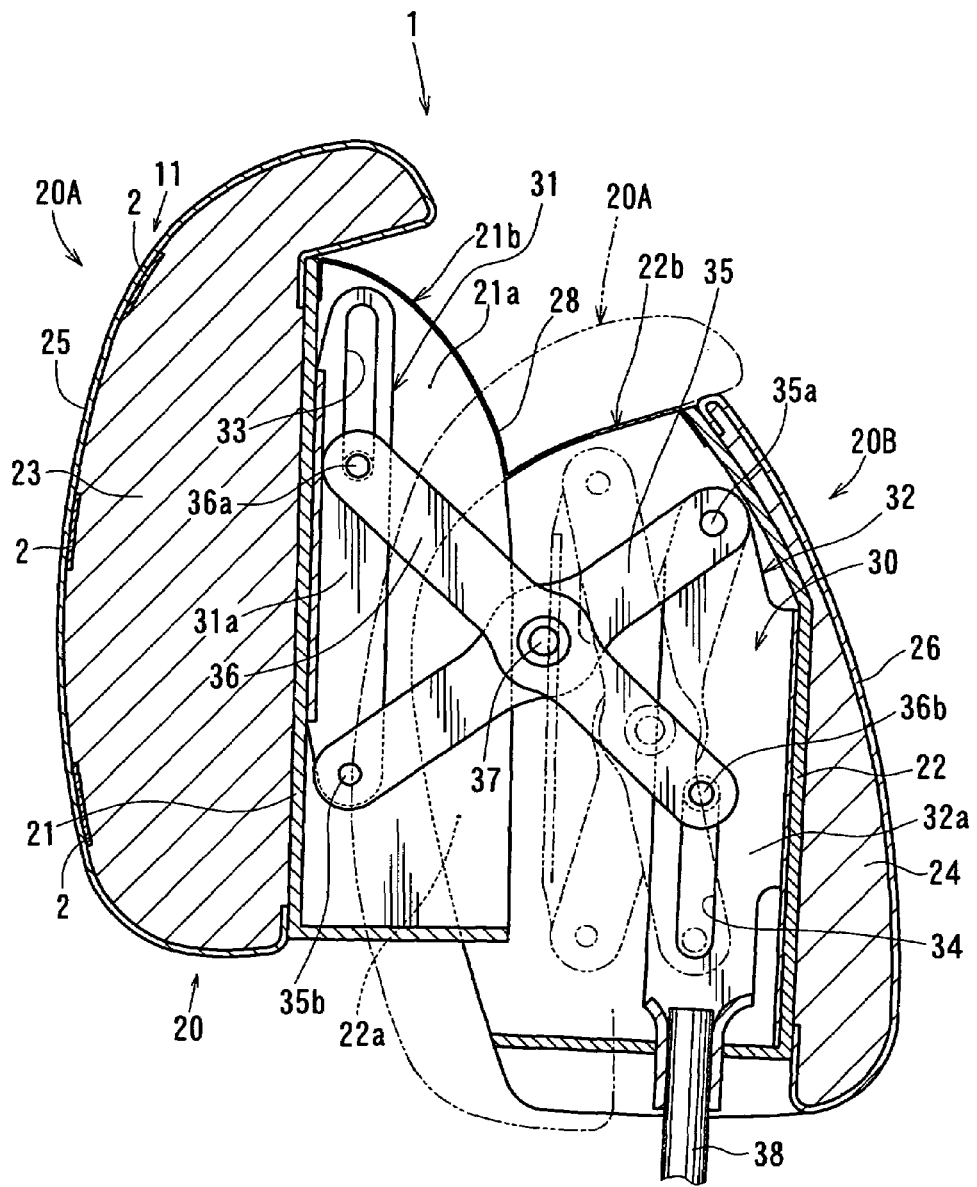
FIG. 4 is a vertical sectional view taken along the line B-B in FIG. 2.

As shown in FIG. 4, the headrest 20 is divided into a front part 20A constituting a front part thereof and a rear part 20B constituting a rear part thereof. A headrest driving mechanism 30 is provided between the front part 20A and the rear part 20B, and a head position detecting unit 11 having a plurality of contact detecting sensors 2 is provided in the front part 20A.

The front part 20A and the rear part 20B have plates 21 and 22 made of resin on the sides of the division as shown in FIG. 4, and pads 23 and 24 molded from urethane foam or the like in positions outside of the plates 21 and 22. The surface of the pads 23 and 24 is covered by skins 25 and 26 made of leather or cloth.

The plate 22 of the rear part 20B is attached to the legs 38 through a base 32. Therefore, the rear part 20B is supported on the seatback 10 through the legs 38.

The front part 20A is connected with the rear part 20B through the headrest driving mechanism 30. As a result, the front part 20A is moved by the headrest driving mechanism 30 between an initial position that is shown in FIG. 1 and an operating position that is shown in FIG. 2.

Figure 3:
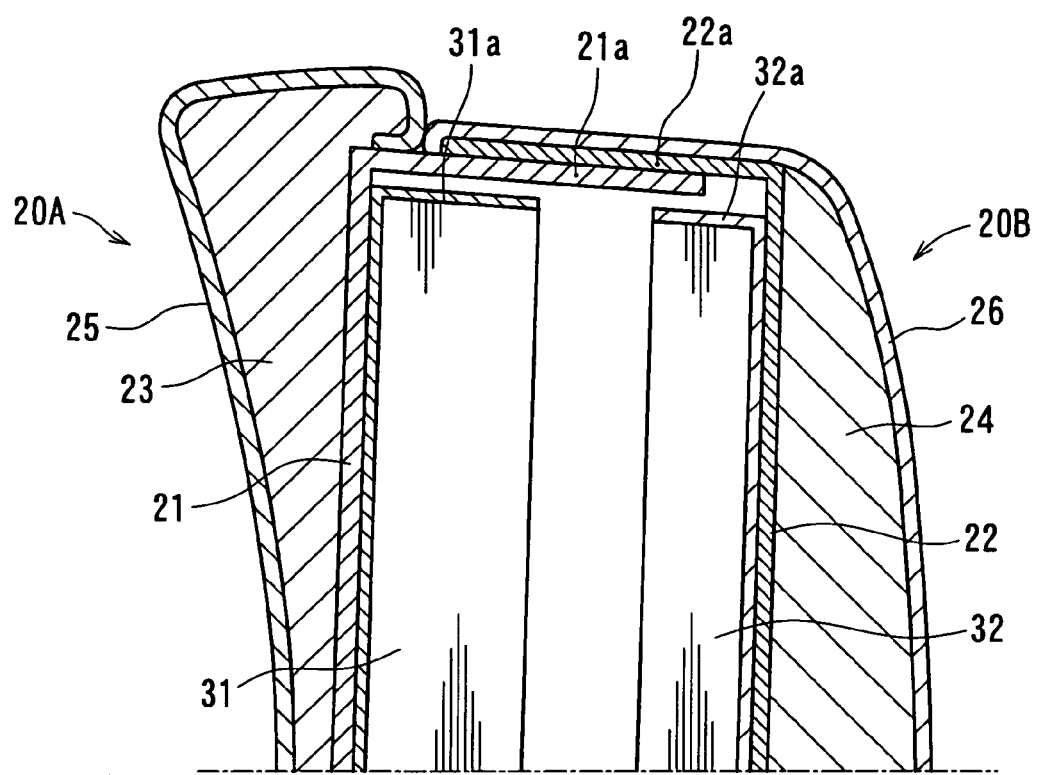
FIG. 3 is a partial transverse sectional view taken along the line A-A in FIG. 1.

As shown in FIG. 3, the plates 21 and 22 have shielding side portions 21a and 22a which are integral therewith, and the side portions protruding from a right end and a left end toward the other plates 21 and 22 as shown in FIG. 3.

The shielding side portions 21a and 22a overlap each other such that the shielding side position 21a is located inside the shielding side portion 22a. The shielding side portions 21a and 22a are in an overlapping relationship even when the front part 20a is moved forward to the operating position as shown in FIG. 4.

Figure 2:
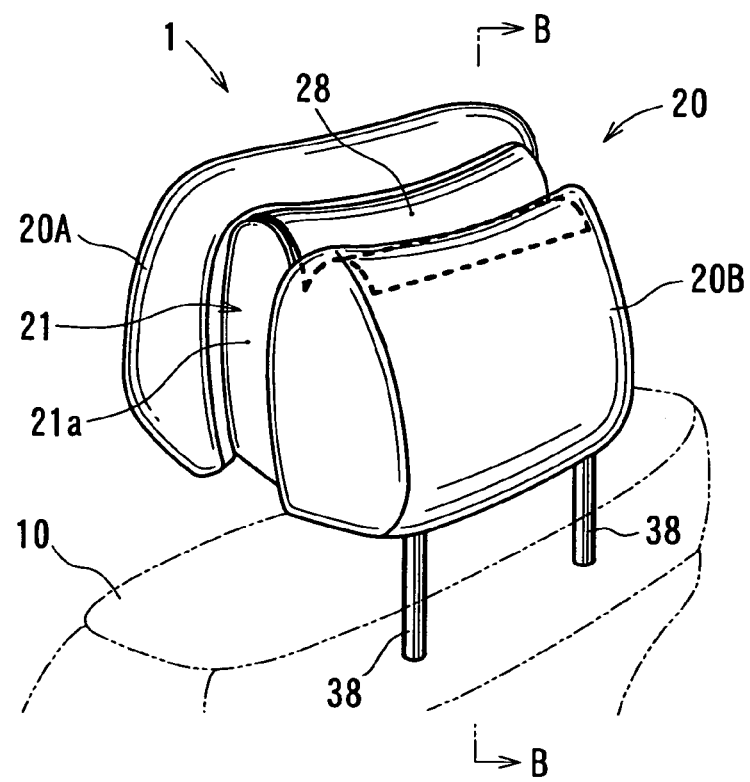
FIG. 2 is a rear perspective view of the active headrest according to Embodiment 1.

A shielding sheet 28 constituted by a resin film is stretched between the front part 20A and the rear part 20B as shown in FIG. 2.

As shown in FIG. 4, a frontward end of the shielding sheet 28 is attached to an upper edge of the plate 21, and a rearward end of the same is attached to an upper edge of the plate 22. Both of left and right ends of the shielding sheet 28 extend along the shielding portions 21a and 22a in a free state.

Therefore, the shielding sheet 28 is spread between the front part 20A and the rear part 20B when the front part 20A is in the operating position shown in FIG. 2 to cover the top side of a gap formed between those parts. When the front part 20A is put in the initial position shown in FIG. 1, the sheet is folded into the gap between the front part 20A and the rear part 20B.

As shown in FIG. 4, the headrest driving mechanism 30 has link members 35 and 36, bases 31 and 32, and an electric drive unit (omitted in FIG. 4).

The bases 31 and 32 are attached to inner surfaces of the plates 21 and 22 as shown in FIG. 3. Upright portions 31a and 32a are formed at right and left edges of the bases 31 and 32 so as to stand from the plates 21 and 22. The upright portions 31a and 32a are formed with guide holes 33 and 34 as shown in FIG. 4.

The guide hole 33 is a slot which is located in an upper region of the upright portion 31a and elongated in the vertical direction. An upper end of the link member 36 is supported at the guide hole 33 through a pin 36a such that it can be moved up and down.

The guide hole 34 is a slot which is located in a lower region of the upright portion 32a and which is elongated in the vertical direction. A lower end of the link member 36 is supported at the guide hole 34 through a pin 36b such that it can be moved up and down.

As shown in FIG. 4, the link members 35 and 36 are rotatably connected by a pin 37 at intermediate portions thereof to form an X-link mechanism.

The link members 35 and 36 are mounted to the front part 20A at one end thereof and mounted to the rear part 20B at another end thereof. That is, an upper end of the link member 35 is rotatably mounted to an upper region of the upright portion 32a through a pin 35a. A lower end of the same is rotatably mounted to a lower region of the upright portion 31a through a pin 35b. The upper end of the link member 36 is supported at the upper region of the upright portion 31a such that it can be moved up and down, and the lower end of the same is supported at a lower region of the upright portion 30a such that it can be moved up and down.

The electric drive unit is a feature to operate the X-link mechanism constituted by the link members 35 and 36, and it includes, for example, a motor. For example, the electric drive unit is assembled to the base 32 and located between the front part 20A and the rear part 20B. The electric driven unit is configured such that it moves the pin 36b up and down along the guide hole 34 to move the lower end of the link member 36 up and down and to thereby operate the link members 35 and 36 like a pantograph.

Thus, the headrest driving mechanism 30 moves the front part 20A in the direction of making it closer or further to or from the rear part 20B.

The active headrest 1 has over-push prevention device (adjusting devices) and automatic retraction device.

The over-push prevention device is for adjusting the amount of movement of the front part 20A in accordance with the position of a head of a passenger to prevent the head of the passenger to be pushed too much by the front part 20A when moved.

Figure 5:
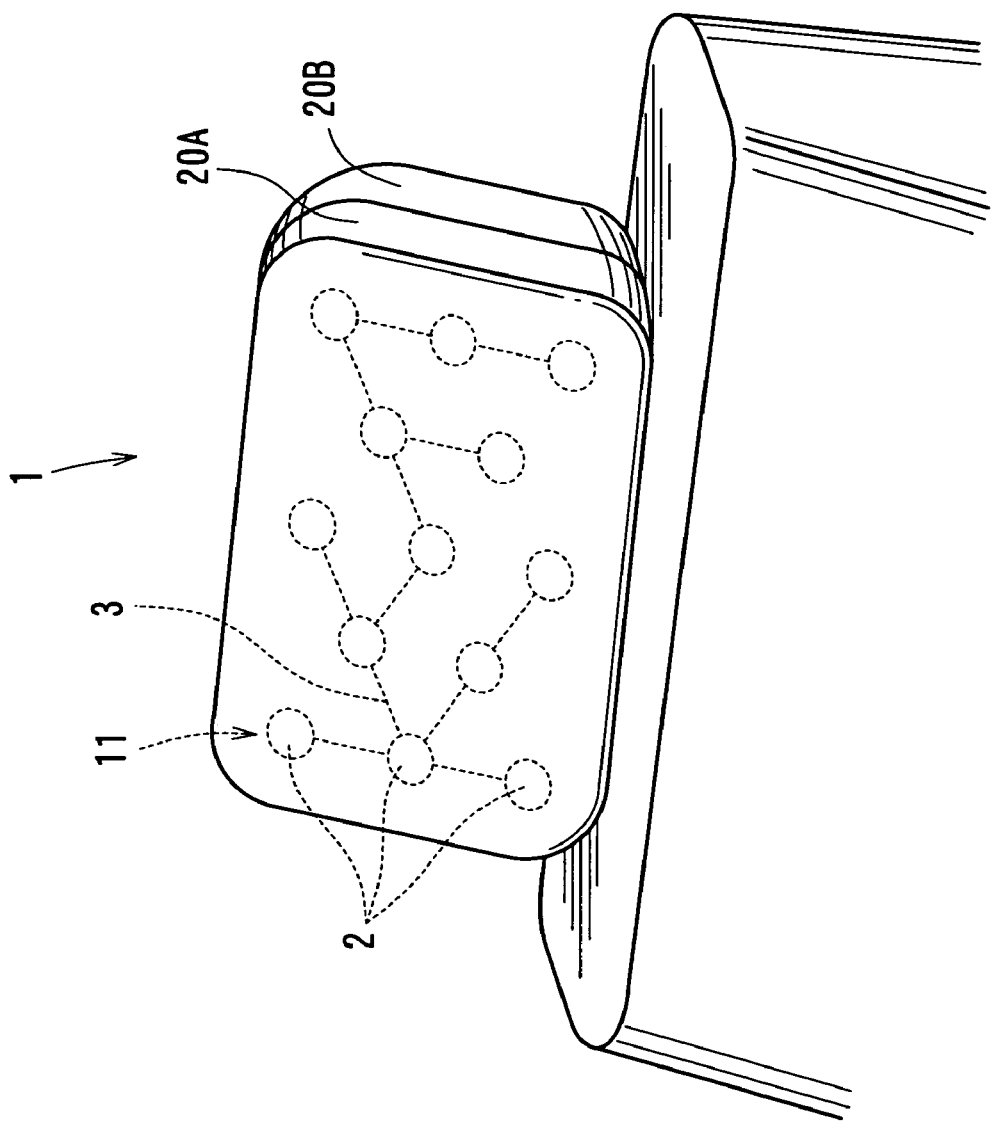
FIG. 5 is a front perspective view of the active headrest according to Embodiment 1.
Figure 8:
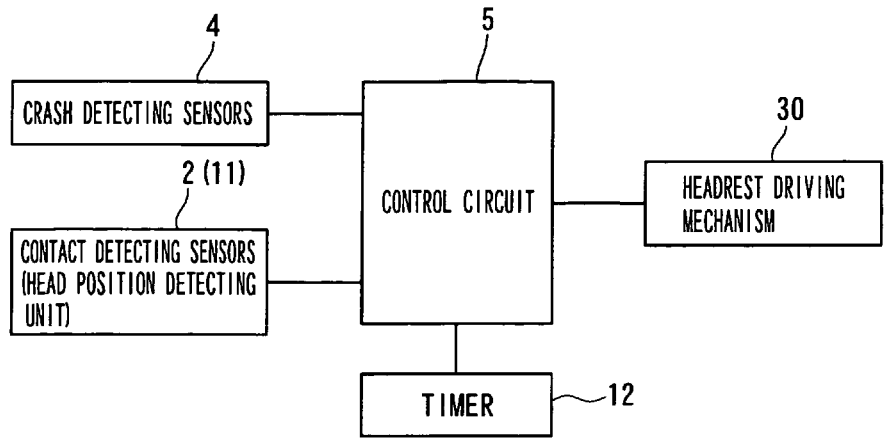
FIG. 8 shows components constituting a headrest controller according to Embodiment 1.

The over-push prevention device includes a control circuit 5 for controlling the headrest driving mechanism 30 and a head position detecting unit 11 having a plurality of contact detecting sensors 2 (see FIGS. 5 and 8).

The head position detecting unit 11 is provided in the front part 20A and moved toward the head of a passenger along with the front part 20A.

The contact detecting sensors 2 are configured to generate a signal when the front part 20A abuts on the head of a passenger, so that they detect an abutting position in which the front part 20A abuts on the head of the passenger.

Figure 6:
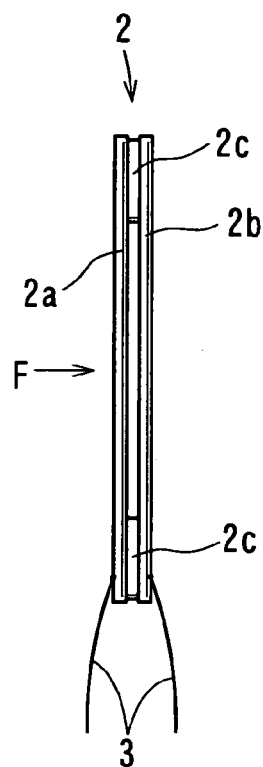
FIG. 6 is a vertical sectional view of a contact detecting sensor according to Embodiment 1.
Figure 7:
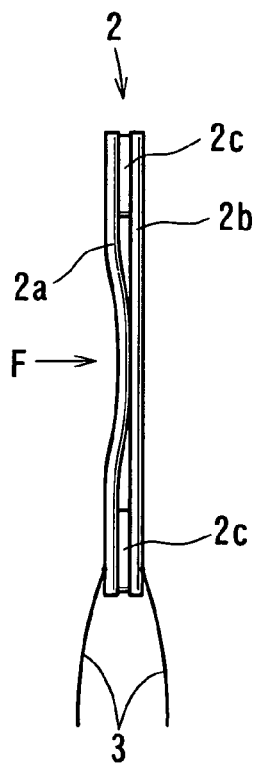
FIG. 7 is a vertical sectional view of the contact detecting sensor according to Embodiment 1.

For example, the contact detecting sensors are planar touch sensors as shown in FIG. 6 which include two disc-shaped plates 2a and 2b and a spacer 2c provided between the two plates 2a and 2b. A lead wire 3 is connected to each of the two plates 2a and 2b. The sensors are configured such that the plate 2a is deformed toward the plate 2b as shown in FIG. 7 when a force F acts on the plate 2a to put the plate 2a and the plate 2b in contact with each other.

The contact detecting sensors 2 are provided inside a front surface of the front part 20A as shown in FIG. 4, and they are provided, for example, between the skin 25 and the pad 23. The plurality of contact detecting sensors 2 are provided in a wide range of a front region of the front part 20A in a dispersed manner.

The plurality of contact detecting sensors 2 are electrically connected through the lead wires 3. Therefore, a detection signal from the plurality of contact detecting sensors 2 can be transmitted to the control circuit 5 using a small number of signal lines.

As shown in FIG. 8, the control circuit 5 receives a detection signal from the contact detecting sensors 2 and controls the headrest driving mechanism 30 based on the detection signal. Thus, the front part 20A is stopped at the abutting position.

Therefore, the stopping position (the amount of movement) of the front part 20A depends on the position of the head of the passenger.

The automatic retraction device is for automatically retracting the front part 20A to the initial position the front part had assumed before the movement, the retracting beginning when the stop time spent by the front part 20A at the abutting position reaches a predetermined time. The automatic retraction device includes a timer 12 and the control circuit 5 (see FIG. 8).

The timer 12 measures the stop time that the front part 20A spends at the abutting position. When the stop time reaches the predetermined time, e.g., 1 to 15 seconds, the control circuit 5 operates the headrest driving mechanism 30 in the opposite direction to retract the front part 20A to the initial position.

The retracting speed of the front part 20A is preferably lower than the advancing speed of the front part 20A.

The vehicle is also provided with a crash detecting sensor 4 for predicting a crash to the rear of the same, and the crash detecting sensor 4 is configured to generate a signal when it predicts a crash to the rear.

As shown in FIG. 8, the headrest controller has the crash detecting sensor 4, the head position detecting unit 11, the control circuit 5, the timer 12, and the headrest driving mechanism 30. A method of control exercised by the headrest controller on the active headrest 1 will now be described.

When the crash detecting sensor 4 predicts a crash to the rear and generates a detection signal, the control circuit 5 operates the headrest driving mechanism 30 based on the detection signal. Then, the link members 35 and 36 operate to move the front part 20A away from the rear part 20B as shown in FIG. 4, and the front part 20A is moved forward and upward from the initial position toward the head of the passenger.

When the front part 20A abuts on the head of the passenger, the contact detecting sensors 2 detects it and output a detection signal. The control circuit 5 stops the headrest driving mechanism 30 based on the detection signal. Thus, the front part 20A is stopped at the abutting position.

Thus, the front part 20A protects the passenger from shock at the time of the possible or predicted crash to the rear of the vehicle.

When no crash to the rear of the vehicle occurs, the automatic retraction device automatically retracts the front part 20A to the initial position which the front part had assumed prior to the movement and after a predetermined time has passed.

The active headrest 1 is configured as described above.

Specifically, the headrest controller includes the head position detecting unit 11 for detecting the state of contact of the headrest with the head during the movement of the headrest (20A) and the control circuit 5 for stopping the headrest (20A) based on a detection signal from the head position detecting unit 11 (see FIG. 8).

Therefore, the headrest (20A) can be stopped at a proper position in accordance with the position of the head of the passenger. The headrest can be stopped at a position where the head is not over-pushed by the headrest.

The active headrest 1 includes the automatic retraction device which moves the front part 20A of the headrest 20 rearward when the front part 20A of the headrest 20 has been stopped for a predetermined time in a predetermined position in which the distance between the head of a passenger and the front surface of the headrest is a predetermined amount.

Therefore, when the forward movement has been unnecessary, e.g., when no crash to the rear has occurred, the front part 20A is automatically returned to the initial position. Since the headrest 20 is thus returned to its original position, it is easy to use.

Figure 9:
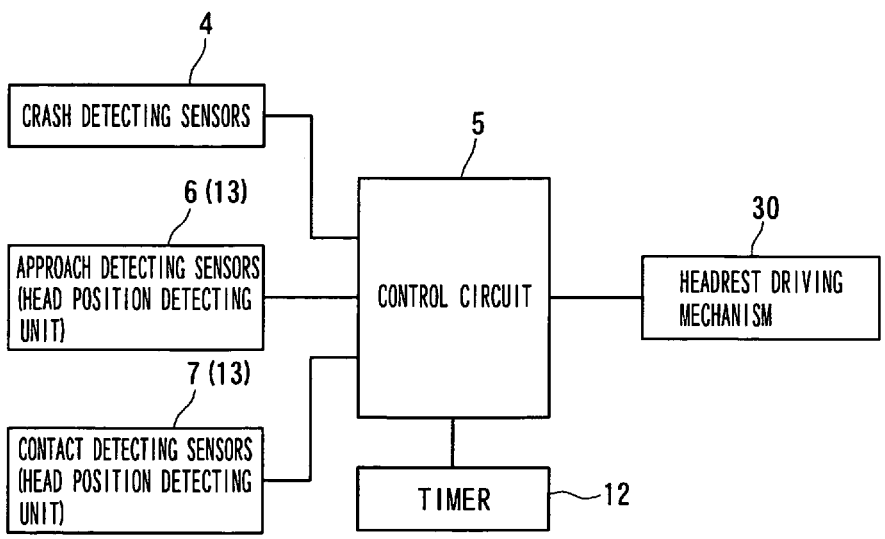
FIG. 9 shows components constituting a headrest controller according to Embodiment 2.

Another configuration of the present invention will be described in reference to FIG. 9. This configuration is similar to the one shown in FIG. 8. However, FIG. 9 includes a head position detecting unit 13 instead of the head position detecting unit 11 shown in FIG. 8. FIG. 9 will be described below, the description focusing on differences from FIG. 8.

The head position detecting unit 13 includes two or more sensors which are different from each other in the method of detection. For example, the head position detecting unit 13 includes approach detecting sensors 6 and contact detecting sensors 7.

The approach detecting sensors 6 are for detecting a state of approach between a headrest and a head of a passenger. For example, they are sensors which output detection signals when the distance between the headrest and the head of a passenger becomes 20 mm or less or, more preferably, 10 mm or less.

For example, the approach detecting sensors 6 are capacitance type sensors which include two capacitor plates, which are configured to utilize the head of a passenger as a dielectric body between the two capacitor plates.

The contact detecting sensors 7 are sensors for detecting a state of contact between the front part of the headrest and the head of the passenger. For example, they have the same configuration as the contact detecting sensors 2 shown in FIGS. 6 and 7.

The approach detecting sensors 6 and the contact detecting sensors 7 may be formed as separate bodies, and each of them may alternatively be integrally formed as a hybrid type.

The head position detecting unit 13 has a plurality of sensors of at least one type among two or more sensors employing different methods of detection. For example, the unit includes a plurality of either or both of approach detecting sensors 6 and contact detecting sensors 7.

Those sensors are provided in a front region of the headrest in a dispersed manner. The plurality of sensors are electrically connected to each other with lead wires and are connected to a control circuit 5. For example, a plurality of the approach detecting sensors 6 are connected to each other with lead wires and are connected to the control circuit 5. A plurality of the contact detecting sensors 7 are connected to each other with lead wires and are connected to the control circuit 5.

As shown in FIG. 9, the headrest controller includes the crash detecting sensor 4, approach detecting sensors 6, contact detecting sensors 7, control circuit 5, timer 12 and headrest driving mechanism 30.

Figure 10:
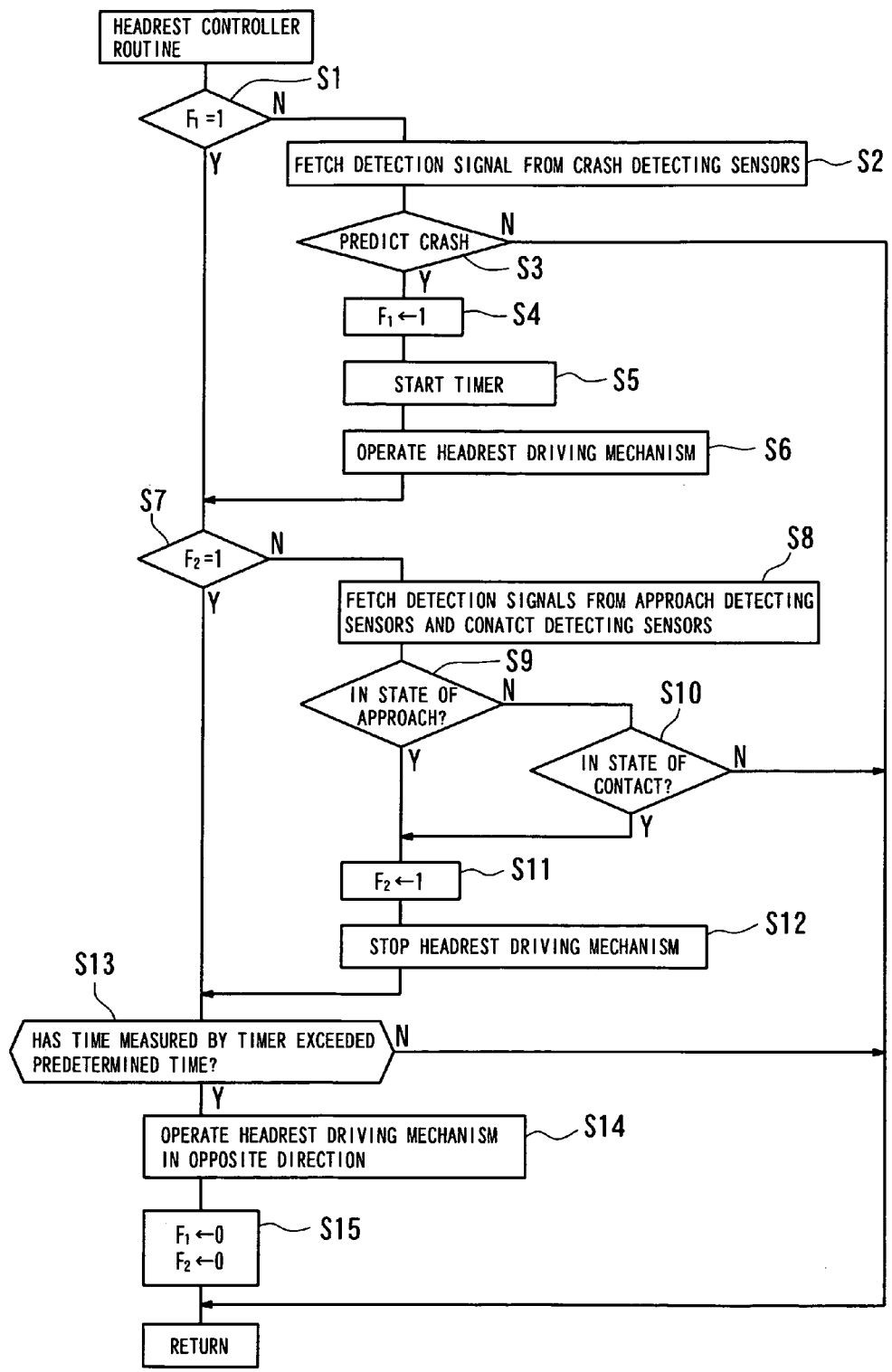
FIG. 10 is a flow chart of a control method of the headrest controller according to Embodiment 2.

A method of control exercised on the headrest controller (headrest) by the control circuit 5 will now be described according to FIG. 10.

First, the control circuit 5 determines whether a first routine has ended or not from a value F1 (step S1). If it is determined that the first routine has ended (if F1=1), it is determined whether a second routine has ended or not (step S7).

If the first routine has not ended (if F1=1 is not true) a detection signal is fetched from the crash detecting sensors 4 (step S2). It is then determined whether there is a possibility of a crash to the rear of the vehicle based on the detection signal (step S3).

If it is determined that no crash to the rear of the vehicle will occur, the control routine is terminated. If it is determined that a crash to the rear of the vehicle will occur, F1 is set at 1 (step S4). Then, the timer 12 is started (step S5), and the headrest driving mechanism 30 is operated.

Thus, the front part of the headrest is advanced toward the head of the passenger.

Subsequently, it is determined whether the second routine has ended or not from a value F2 (step S7). If it is determined that the second routine has ended (if F2=1), it is determined whether the time measured by the timer 12 has exceeded a predetermined time or not (step S13).

If it is determined that the second routine has not ended (if F2=1 is not true), a detection signal from the approach detecting sensors 6 and a detection signal from the contact detecting sensors 7 are fetched (step S8).

Next, it is determined whether there is a state of approach in which the distance between the headrest and the head of the passenger is equal to or smaller than a predetermined amount based on the detection signal from the approach detecting sensors 6 (step S9).

When it is determined that there is a state of approach, F2 is set at 1 (step S11).

When it is determined that there is no state of approach, it is determined whether the headrest is in contact with the head of the passenger based on the detection signal from the contact detecting sensors 7 (step S10). The control routine is terminated when it is determined that there is no state of contact.

When it is determined that there is a state of contact, F2 is set at 1 (step S11). The headrest driving mechanism 30 is then stopped (step S12). As a result, the headrest is prevented from over-pushing the head of the passenger in the forward direction.

Next, it is determined whether the time measured by the timer 12 has exceeded the predetermined time (step S13). If the measured time has not exceeded the predetermined time, the control routine is once terminated and then resumed.

When the measured time has exceeded the predetermined time, the headrest driving mechanism 30 is operated in the opposite direction (step S14). Thus, the front part of the headrest is returned to the initial position. Consequently, the front part of the headrest returns to the initial position after stopping at the predetermined position for the predetermined time. Finally, F1 and F2 are set at 0 (step S15).

Embodiment 2 is configured as described above.

Specifically, the head position detecting unit 13 includes two or more sensors which are different from each other in the method of detection. For example, it includes the approach detecting sensors 6 for detecting a predetermined state of approach and the contact detecting sensors 7 for detecting a predetermined state of contact. The control circuit 5 stops the headrest when the predetermined state of approach or the state of contact is detected by either of the sensors.

Therefore, a state in which the headrest is approaching the head of the passenger or in contact with the same is detected by either of the sensors. Even when the state is not detected either of the sensors, the state can be detected by another sensor. The state of approach or the state of contact can therefore be reliably detected.

Embodiment 3

Another configuration according to the present invention includes a camera mounted on the ceiling of a cabin and a head position detection unit having a measuring device for measuring the distance between the head of a passenger and a headrest based on a picture from the camera instead of the head position detecting unit 11 shown in FIG. 8.

This configuration includes a control circuit, which stops the headrest based on a signal from the head position detection unit.

The present invention is not limited to configurations described above and may be implemented in the following modes.

(1) The active headrests according to Embodiments 1 to 3 are configured to operate based on a detection signal from a crash detecting sensor for predicting a rear crash. Alternatively, an active headrest may include a crash detecting sensor for detecting a rear crash and may be configured to operate based on a signal from the crash detecting sensor.

(2) The head position detecting unit according to Embodiment 1 includes contact detecting sensors for detecting that a front part of a headrest has abutted on the head of the passenger. Alternatively, the head position detecting unit may have a configuration including approach detecting sensors according to Embodiment 2 instead of the contact detecting sensors.

(3) The head position detecting units according to Embodiment 1 and 2 are provided between a skin and pads as shown in FIG. 4. Alternatively, a configuration may be employed, in which the head position detecting unit is provided within the thickness of the skin. For example, a configuration may be employed, in which the skin has a leather layer and a laminate layer and in which the head position detecting unit is provided between the leather layer and the laminate layer. The head position detecting unit may alternatively be provided in a pad.

The present invention may incorporate an integral configuration, in which a headrest includes a front part and a rear part integral with each other and in which the front part of the headrest is tilted (moved) along with the headrest as a whole.

(5) The head position detecting units according to Embodiments 1 and 2 include a plurality of sensors, and the plurality of sensors are provided in a front part of a headrest in a dispersed manner. Alternatively, a configuration may be employed, in which one or a plurality of sensors occupy a wide area of the front side of the front part, e.g., 80% or more of the front region.

(6) The automatic retraction devices according to Embodiments 1 to 3 retracts a front part of a headrest after the front part of the headrest is kept stopped for a predetermined time at a predetermined position. Alternatively, a configuration may be employed, in which the automatic retraction devices includes determination means for determining that no crash to the rear of a vehicle will occur, e.g., determination means for determining that the object of measurement has become further and in which the front part of the headrest is retracted based on a signal output by the determination means.

(7) The invention may be configured as follows.

The present invention may include a front part of the headrest being moved along with the headrest as a whole or away from a rear part of the headrest toward the head of a passenger based on a signal from a sensor for predicting or detecting a crash to the rear of the vehicle, characterized by including over-push prevention devices for adjusting the amount of movement of the front part of said headrest according to the position of the head of said passenger to prevent the front part of said headrest thus moved from over-pushing the head of said passenger.

Therefore, according to the invention, the front part of the headrest moves toward the head of a passenger and stops at a proper position in accordance with the position of the head of the passenger. That is, the front part stops at a position in which the head is not over-pushed. Thus, the head of the passenger is prevented from being over-pushed by the front part of the headrest.

The present invention may include an over-push prevention device configured to stop said front part in an abutting position in which the front part of the headrest abuts on the head of the passenger or in a rear position in which the distance of said front part to the head of said passenger is equal to or smaller than a predetermined value.

Therefore, according to the invention, the front part of the headrest moves toward the head of a passenger and stops at the abutting position or the near position. As a result, it is possible to prevent the front part of the headrest from over-pushing the head of the passenger and to protect the passenger properly at the time of a rear crash or before a rear crash.

The present invention may include an over-push prevention device having a head position detecting unit for detecting that the front part of the headrest has abutted on the head of the passenger or has approached to the same up to the near position and is configured to stop the front part of said headrest based on a detection signal from the head position detecting unit.

Thus, according to the invention, the over-push prevention device includes a head position detecting unit. The head position detecting unit detects an abutting position or a near position (hereinafter referred to as an abutting position or the like) when the front part of the headrest is moved. As a result, the over-push prevention device can easily detect the abutting position or the like because it has the head position detecting unit. Since the head position detecting unit detects the abutting position or the like when the front part is moved, the abutting position or the like in accordance with the position of the head of the passenger. Thus, the abutting position or the like is easily and accurately detected, which makes it possible to stop the front part of the headrest at a proper position easily.

The present invention may include a head position detecting unit provided in the front part of the headrest.

Therefore, according to the invention, the head position detecting unit can detect the abutting position or the near position in a position close to the head. As a result the head position detecting unit can accurately detect the abutting position or the near position.

The present invention may include a head position detecting unit having a plurality of sensors and that the plurality of sensors are provided in a front region of the front part of the headrest in a dispersed manner.

Therefore, according to the invention, the head position detecting unit can detect the abutting position or the near position in a wide range of the front side of the front part. As a result, the head position detecting unit is configured such that it can properly work in a position in the lateral direction of the head of the passenger.

The present invention may include automatic retraction devices which automatically retracts said front part to the initial position that the front part assumed before the movement when the stop time of the front part of the headrest at the abutting position or the stop time of the same in the near position reaches a predetermined time or when a predetermined signal is received.

Therefore, according to the invention, the front part of the headrest returns to the initial position when the predetermined time passes after it is moved. As a result, the front part is automatically returned to the initial position when the forward movement has become unnecessary, e.g., when no rear crash has occurred. Since the headrest thus returns to the normal state, it is easy to use.

The invention claimed is:

1. A headrest controller for moving a part of a headrest of a vehicle seat toward a head of a passenger comprising:
   a headrest including a front part and a rear part;
   a headrest driving mechanism disposed between the front part and the rear part for moving the front part with respect to the rear part;
   a head position detecting unit including a first sensor for detecting a distance between the front part of the headrest and an object positioned adjacent the headrest, and a second sensor for detecting contact between the object and the front part of the headrest, the first and second sensors being operatively coupled with the front part of the headrest;
   a control circuit operatively coupled with said headrest driving mechanism; and
   a timer in communication with the control circuit for measuring a stop time when the front part of the headrest is in a near position or in an abutting position, the near position being based on a detection signal from the first sensor and being defined as where a distance between the front part and the object is equal to or smaller than a predetermined value, the abutting position being based on a detection signal from the second sensor and being defined as where the front part of the headrest contacts the object,
   wherein the headrest driving mechanism includes link members for moving the front part of the headrest along a diagonally forward and upward path with respect to the rear part of the headrest, the link members being rotatably connected at intermediate portions thereof, one of the link members including an upper end rotatably mounted to an upper region of the rear part of the headrest and a lower end rotatbly mounted to a lower region of the front part of the headrest, the other of the link members including an upper end slideably and rotatably connected to an upper region of the front part of the head rest and a lower end slideably and rotatably coupled to a lower region of the rear part of the headrest, and
   wherein the control circuit is adapted to alter movement of the headrest driving mechanism to stop the front part of the headrest at any point along the diagonally forward and upward path corresponding to the abutting position or the near position, and wherein the control circuit is adapted to return the front part of the headrest to an initial position by operating the headrest driving mechanism after the stop time measured by the timer reaches a predetermined time.

2. A headrest controller as in claim 1, wherein the first sensor is a plurality of sensors.

3. A headrest controller as in claim 1, wherein the first sensor is a capacitive type sensor.

4. A headrest controller as in claim 1, wherein the second sensor is a plurality of sensors.

5. A headrest controller as in claim 1, wherein the second sensor is a contact type sensor.

6. A headrest controller as in claim 1, wherein the head position detecting unit is provided in the front part of the headrest.

7. A headrest controller as in claim 1 wherein the predetermined time is in a range of 1 to 15 seconds.

8. A headrest controller comprising:
   a crash detecting sensor for predicting or detecting a crash to a rear of a vehicle;
   a headrest including a front part and a rear part;
   a headrest driving mechanism disposed between the front part and the rear part of the headrest for moving the front part toward a head of a passenger to reduce the distance between the front part of the headrest and the head;
   a head position detecting unit including a first sensor to detect a distance between the head and the front part of the headrest, and a second sensor for detecting contact between the head and the front part of the headrest, the first and the second sensors being operatively coupled with the front part of the headrest;
   a control circuit for operating the headrest driving mechanism when the crash detecting sensor outputs a detection signal and altering movement of the headrest driving mechanism when the head position detecting unit outputs a detection signal; and
   a timer for measuring a stop time when the front part of the headrest is in an operating position, the timer being in communication with the control circuit,
   wherein the control circuit is adapted to stop the front part of the headrest when the predetermined state of approach or state of contact is detected by either of the first and second sensors, the control circuit being further adapted to operate the headrest driving mechanism to return the front part of the headrest from the operating position to an initial position after the stop time measured by the timer reaches a predetermined time, and
   wherein the headrest driving mechanism includes link members for moving the front part of the headrest diagonally forward and upward with respect to the rear part of the headrest, the link members being rotatably connected at intermediate portions thereof, one of the link members including an upper end rotatably mounted to an upper region of the rear part of the headrest and a lower end rotatbly mounted to a lower region of the front part of the headrest, the other of the link members including an upper end slideably and rotatably connected to an upper region of the front part of the head rest and a lower end slideably and rotatably coupled to a lower region of the rear part of the headrest.

9. A headrest controller as in claim 8, wherein the first sensor includes a plurality of sensors.

10. A headrest controller as in claim 8, wherein the first sensor is a capacitive type sensor.

11. A headrest controller as in claim 8, wherein the second sensor includes a plurality of sensors.

12. A headrest controller as in claim 8, wherein first and second sensor each have a detection output signal, further wherein the control circuit stops the headrest based on the output detection signal of the sensor that occurs earlier in time.

13. A headrest controller as in claim 8, wherein the predetermined time is in a range of 1 to 15 seconds.

14. A headrest device comprising:

a front portion and a back portion;

a headrest driving mechanism disposed between the front portion and the back portion for moving the front portion with respect to the back portion;

a head position detecting unit including a first sensor to detect a distance between an object moving towards the front portion and the front portion, and a second sensor for detecting contact between the object and the front portion;

a control circuit to alter movement of the front portion based on a detection signal from the head position detecting unit; and a timer for measuring a stop time when the front part of the headrest is in an operating position, the timer being in communication with the control circuit, wherein the control circuit is adapted to alter movement of the headrest driving mechanism to stop the front part of the headrest at the operating position, the operating position being based on a detection signal from the head position detection unit, and wherein the control circuit is adapted to return the front part of the headrest to an initial position by operating the headrest driving mechanism after the stop time measured by the timer reaches a predetermined time, and wherein the headrest driving mechanism includes link members for moving the front part of the headrest diagonally forward and upward with respect to the rear part of the headrest, the link members being rotatably connected at intermediate portions thereof, one of the link members including an upper end rotatably mounted to an upper region of the rear part of the headrest and a lower end rotatbly mounted to a lower region of the front part of the headrest, the other of the link members including an upper end slideably and rotatably connected to an upper region of the front part of the head rest and a lower end slideably and rotatably coupled to a lower region of the rear part of the headrest.

15. A headrest device as in claim 14, wherein the first sensor is a plurality of sensors.

16. A headrest device as in claim 14, wherein the first sensor is a capacitive type sensor.

17. A headrest device as in claim 14, wherein the second sensor is a plurality of sensors.

18. A headrest device as in claim 14, wherein the second sensor is a contact type sensor.

19. A headrest device as in claim 14, wherein the head position detecting unit is positioned in the front portion.

20. A headrest device as in claim 14, wherein the predetermined time is in a range of 1 to 15 seconds.

* * * * *